US012664750B2

(12) United States Patent
Sharma et al.

(10) Patent No.: US 12,664,750 B2
(45) Date of Patent: Jun. 23, 2026

(54) SYSTEM AND METHOD OF CONDITIONAL NEURAL FLOORPLANS FOR STATIC-DYNAMIC DISENTANGLEMENT

(71) Applicants: TOYOTA RESEARCH INSTITUTE, INC., Los Altos, CA (US); MASSACHUSETTS INSTITUTE OF TECHNOLOGY, Cambridge, MA (US)

(72) Inventors: Prafull Sharma, Cambridge, MA (US); Ayush Tewari, Cambridge, MA (US); Yilun Du, Cambridge, MA (US); Sergey Zakharov, San Francisco, CA (US); Rares Andrei Ambrus, San Francisco, CA (US); Adrien David Gaidon, Mountain View, CA (US); William Tafel Freeman, Acton, MA (US); Frederic Pierre Durand, Somerville, MA (US); Joshua B. Tenenbaum, Cambridge, MA (US); Vincent Sitzmann, Cambridge, MA (US)

(73) Assignees: TOYOTA RESEARCH INSTITUTE, INC., Los Altos, CA (US); TOYOTA JIDOSHA KABUSHIKI KAISHA, Aichi-Ken (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 459 days.

(21) Appl. No.: 18/136,260

(22) Filed: Apr. 18, 2023

(65) Prior Publication Data

US 2024/0005627 A1     Jan. 4, 2024

Related U.S. Application Data

(60) Provisional application No. 63/343,807, filed on May 19, 2022.

(51) Int. Cl.
*G06V 10/44* (2022.01)
*G01C 21/34* (2006.01)
(Continued)

(52) U.S. Cl.
CPC ......... *G06V 10/44* (2022.01); *G01C 21/3407* (2013.01); *G06T 3/40* (2013.01);
(Continued)

(58) Field of Classification Search
CPC ...... G06V 10/44; G06V 10/25; G06V 10/454; G06V 20/64; G06V 10/806; G06V 20/58;
(Continued)

(56) References Cited

U.S. PATENT DOCUMENTS

2019/0096125 A1*   3/2019   Schulter ............... G05D 1/0088
2020/0150235 A1*   5/2020   Beijbom ................ G01S 7/417
(Continued)

OTHER PUBLICATIONS

Yuan, Wentao, et al., "STaR: Self-supervised Tracking and Reconstruction of Rigid Objects in Motion with Neural Rendering," arXiv:2101.01602v1 [cs.CV] Dec. 22, 2020. (Year: 2020).*
(Continued)

*Primary Examiner* — Vu Le
*Assistant Examiner* — Rachel Anne Ometz
(74) *Attorney, Agent, or Firm* — SEYFARTH SHAW LLP

(57) ABSTRACT

A method of conditional neural ground planes for static-dynamic disentanglement is described. The method includes extracting, using a convolutional neural network (CNN), CNN image features from an image to form a feature tensor. The method also includes resampling unprojected 2D features of the feature tensor to form feature pillars. The method further includes aggregating the feature pillars to form an entangled neural ground plane. The method also includes decomposing the entangled neural ground plane into a static neural ground plane and a dynamic neural ground plane.

15 Claims, 9 Drawing Sheets

(51) Int. Cl.

| | |
|---|---|
| *G06T 3/40* | (2024.01) |
| *G06T 7/50* | (2017.01) |
| *G06V 10/25* | (2022.01) |

(52) U.S. Cl.
CPC ................ *G06T 7/50* (2017.01); *G06V 10/25* (2022.01); *G06T 2207/20084* (2013.01); *G06T 2207/30252* (2013.01)

(58) Field of Classification Search
CPC ...... G06V 10/82; G01C 21/3407; G06T 3/40; G06T 7/50; G06T 2207/20084; G06T 2207/30252; G06T 7/11; G06T 7/215; G06T 7/55; G06T 7/70; G06T 2207/10021; G06T 2207/10024; G06T 2207/10028; G06T 2207/20081; G06T 2210/61; G06T 17/00
See application file for complete search history.

(56) References Cited

U.S. PATENT DOCUMENTS

| | | | |
|---|---|---|---|
| 2021/0279950 A1 | 9/2021 | Phalak | |
| 2022/0026917 A1 | 1/2022 | Beijbom et al. | |
| 2022/0371606 A1* | 11/2022 | Vora | G01C 21/3807 |
| 2023/0130281 A1* | 4/2023 | Brown | G06N 3/088 345/420 |
| 2023/0205216 A1* | 6/2023 | Beijbom | H04N 19/597 701/27 |
| 2024/0212206 A1* | 6/2024 | Hilsenbeck | G06V 20/58 |
| 2024/0371081 A1* | 11/2024 | Matthews | G06T 15/20 |

OTHER PUBLICATIONS

Yuan et al., "STaR: Self-supervised Tracking and Reconstruction of Rigid Objects in Motion with Neural Rendering," arXiv:2101.01602v1 [cs.CV] Dec. 22, 2020 (Year: 2020).*
Ost et al., "Neural Scene Graphs for Dynamic Scenes", arXiv:2011.10379v3 (Year: 2021).*
Lang et al., "PointPillars: Fast Encoders for Object Detection from Point Clouds", arXiv:1812.05784v2 (Year: 2019).*
Anonymous, "Learning to Reconstruct Disentangled Movable and Immovable 3D Scene Representations," 36th Conference on Neural Information Processing Systems (NeurIPS 2022).
Chan, Eric R., et al., "Efficient Geometry-aware 3D Generative Adversarial Networks," arXiv:2112.07945v2 [cs.CV] Apr. 27, 2022.
Crawford, Eric, et al., "Spatially Invariant Unsupervised Object Detection with Convolutional Neural Networks," Proceedings of the AAAI Conference on Artificial Intelligence, 2019.
Devries, Terrance, et al., "Unconstrained Scene Generation with Locally Conditioned Radiance Fields," arXiv:2104.00670v1 [cs.CV] Apr. 1, 2021.
Ali Eslami, S.M., et al., "Attend, Infer, Repeat: Fast Scene Understanding with Generative Models," arXiv:1603.08575v3 [cs.CV] Aug. 12, 2016.
Jang, Wonbong, et al., "CodeNeRF: Disentangled Neural Radiance Fields for Object Categories," arXiv:2109.01750v1 [cs.GR] Sep. 3, 2021.
Kosiorek, Adam R., et al., "Sequential Attend, Infer, Repeat: Generative Modelling of Moving Objects," arXiv:1806.01794v2 [cs.LG] Nov. 21, 2018.
Liu, Lingjie, et al., "Neural Sparse Voxel Fields," arXiv:2007.11571v2 [cs.CV] Jan. 6, 2021.
Lombardi, Stephen, et al., "Neural vols. Learning Dynamic Renderable Volumes from Images," ACM Trans. Graph., vol. 38, No. 4, Article 65, Publication date: Jul. 2019.
Mildenhall, Ben, et al., "NeRF: Representing Scenes as Neural Radiance Fields for View Synthesis," arXiv:2003.08934v2 [cs.CV] Aug. 3, 2020.
Niemeyer, Michael, et al., "Differentiable Volumetric Rendering: Learning Implicit 3D Representations without 3D Supervision," arXiv:1912.07372v2 [cs.CV] Mar. 23, 2020.
Peng, Songyou, et al., "Convolutional Occupancy Networks," arXiv:2003.04618v2 [cs.CV] Aug. 1, 2020.
Reiser, Christian, et al., "KiloNeRF: Speeding up Neural Radiance Fields with Thousands of Tiny MLPs," arXiv:2103.13744v2 [cs.CV] Aug. 2, 2021.
Sajjadi, Mehdi S.M., et al., "Scene Representation Transformer: Geometry-Free Novel View Synthesis Through Set-Latent Scene Representations," arXiv:2111.13152v3 [cs.CV] Mar. 29, 2022.
Sitzmann, Vincent, et al., "DeepVoxels: Learning Persistent 3D Feature Embeddings," arXiv:1812.01024v2 [cs.CV] Apr. 11, 2019.
Sitzmann, Vincent, et al., "Light Field Networks: Neural Scene Representations with Single-Evaluation Rendering," arXiv:2106.02634v2 [cs.CV] Jan. 18, 2022.
Sitzmann, Vincent, et al., "Scene Representation Networks: Continuous 3D-Structure-Aware Neural Scene Representations," arXiv:1906.01618v2 [cs.CV] Jan. 28, 2020.
Tschernezki, Vadim, et al., "NeuralDiff: Segmenting 3D objects that move in egocentric videos," arXiv:2110.09936v1 [cs.CV] Oct. 19, 2021.
Yang, Shichao, et al., "CubeSLAM: Monocular 3D Object SLAM," arXiv:1806.00557v2 [cs.RO] Apr. 5, 2019.
Yariv, Lior, et al., "Multiview Neural Surface Reconstruction by Disentangling Geometry and Appearance," 34th Conference on Neural Information Processing Systems (NeurIPS 2020).
Yu, Alex, et al., "pixelNeRF: Neural Radiance Fields from One or Few Images," arXiv:2012.02190v3 [cs.CV] May 30, 2021.
Yuan, Wentao, et al., "STaR: Self-supervised Tracking and Reconstruction of Rigid Objects in Motion with Neural Rendering," arXiv:2101.01602v2 [cs.CV] Dec. 22, 2020.

* cited by examiner

800

┌─────────────────────────────────────────────────────────┐
│                                                    ⌐ 802  │
│  EXTRACT, USING A CONVOLUTIONAL NEURAL NETWORK (CNN),     │
│   FEATURES FROM AN IMAGE TO FORM A FEATURE TENSOR        │
└─────────────────────────────────────────────────────────┘
                            │
                            ▼
┌─────────────────────────────────────────────────────────┐
│                                                    ⌐ 804  │
│   RESAMPLE UNPROJECTED 2D FEATURES OF THE FEATURE        │
│        TENSOR TO FORM FEATURE PILLARS                     │
└─────────────────────────────────────────────────────────┘
                            │
                            ▼
┌─────────────────────────────────────────────────────────┐
│                                                    ⌐ 806  │
│  AGGREGATE THE FEATURE PILLARS TO FORM AN ENTANGLED      │
│              NEURAL GROUND PLANE                          │
└─────────────────────────────────────────────────────────┘
                            │
                            ▼
┌─────────────────────────────────────────────────────────┐
│                                                    ⌐ 808  │
│  DECOMPOSE THE ENTANGLED NEURAL GROUND PLANE INTO A      │
│   STATIC NEURAL GROUND PLANE AND A DYNAMIC NEURAL        │
│                  GROUND PLANE                             │
└─────────────────────────────────────────────────────────┘

*FIG. 8*

SYSTEM AND METHOD OF CONDITIONAL NEURAL FLOORPLANS FOR STATIC-DYNAMIC DISENTANGLEMENT

CROSS-REFERENCE TO RELATED APPLICATION

The present application claims priority to U.S. Provisional Patent Application No. 63/343,807, filed on May 19, 2022, and titled "CONDITIONAL NEURAL FLOORPLANS," the disclosure of which is expressly incorporated by reference in its entirety.

BACKGROUND

Field

Certain aspects of the present disclosure generally relate to machine learning and, more particularly, a system and method of conditional neural floorplans for static-dynamic disentanglement.

Background

Autonomous agents rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

Autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be in communication with a device, such as an autonomous vehicle for collecting unlabeled 3D data.

Parsing a scene into movable objects and an immovable background is an important aspect of visual perception, to which humans succeed given just a single, static image. Furthermore, human perception is capable of completing the 3D geometry of occluded portions of objects, such as a mug or a car, given a partial observation from a single viewpoint. A self-supervised approach that learns to reconstruct representations of 3D scenes that disentangle a static background from movable objects, while completing occluded regions is desired.

SUMMARY

A method of conditional neural ground planes for static-dynamic disentanglement is described. The method includes extracting, using a convolutional neural network (CNN), CNN image features from an image to form a feature tensor. The method also includes resampling unprojected 2D features of the feature tensor to form feature pillars. The method further includes aggregating the feature pillars to form an entangled neural ground plane. The method also includes decomposing the entangled neural ground plane into a static neural ground plane and a dynamic neural ground plane.

A non-transitory computer-readable medium having program code recorded thereon of conditional neural ground planes for static-dynamic disentanglement is described. The program code is executed by a processor. The non-transitory computer-readable medium includes program code to extract, using a convolutional neural network (CNN), CNN image features from an image to form a feature tensor. The non-transitory computer-readable medium also includes program code to resample unprojected 2D features of the feature tensor to form feature pillars. The non-transitory computer-readable medium further includes program code to aggregate the feature pillars to form an entangled neural ground plane. The non-transitory computer-readable medium also includes program code to decompose the entangled neural ground plane into a static neural ground plane and a dynamic neural ground plane.

A system of conditional neural ground planes for static-dynamic disentanglement is described. The system includes a feature tensor formation model to extract, using a convolutional neural network (CNN), CNN image features from an image to form a feature tensor. The system also includes a feature pillar formation module to resample unprojected 2D features of the feature tensor to form feature pillars. The system further includes a neural ground plane formation model to aggregate the feature pillars to form an entangled neural ground plane. The system also includes a static-dynamic disentanglement model to decompose the entangled neural ground plane into a static neural ground plane and a dynamic neural ground plane.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 8 is a flowchart illustrating a method for conditional neural ground planes for static-dynamic disentanglement, according to aspects of the present disclosure.

DETAILED DESCRIPTION

Figure 1:
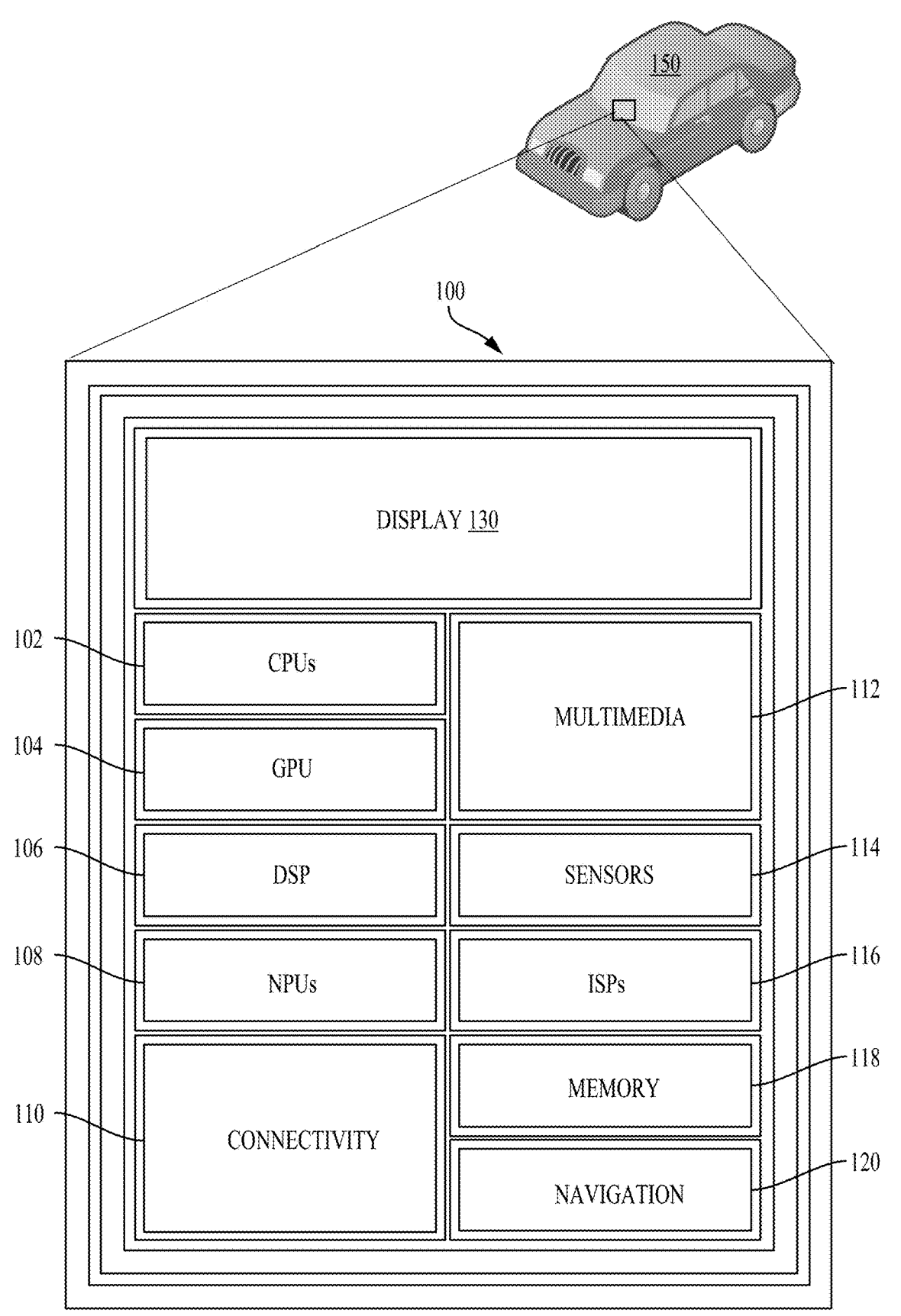
FIG. 1 illustrates an example implementation of designing a system using a system-on-a-chip (SOC) for conditional neural floorplans to enable static-dynamic disentanglement, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be in communication with a device, such as an autonomous vehicle for collecting unlabeled 3D data from which to perform object detection.

Parsing a scene into movable objects and an immovable background is an important aspect of visual perception. Humans succeed at this task of parsing a scene into movable objects and an immovable background given just a single, static image. Furthermore, human perception is capable of completing the 3D geometry of occluded portions of objects, such as a mug or a car, given a partial observation from a single viewpoint. These fundamental skills of scene understanding are largely self-supervised, and learned simply by moving in and interacting with a 3D environment. A self-supervised approach that learns to reconstruct representations of 3D scenes that disentangle a static background from movable objects, while completing occluded regions is desired.

Aspects of the present disclosure recognize that motion is an important cue to learn as a prior for object discovery, while leveraging motion as an objectness cue and training on multi-view videos. Some aspects of the present disclosure learn to map a single image to a 3D neural scene representation that is disentangled into a static background and movable object 3D representations. Specifically, given a single image, some aspects of the present disclosure provide a model that infers a neural ground plane, including a 2D grid of learned features aligned with the ground plane. As described, neural ground planes exploit the fact that in scenes with physical objects, the physical objects move mostly under their own power, such as streets with cars, pedestrians, and bicyclists. As a consequence of gravity, most of these objects move on a 2D ground plane. For example, a neural ground plane offers a dense, yet memory-efficient, neural scene representation. As described, the term neural ground plane may be interchangeably referred to a neural floor plan.

In these aspects of the present disclosure, continuous 3D points are decoded for volume rendering by projecting the continuous 3D points on the neural ground plane, retrieving the respective features, and decoding the respective features using multilayer perception (MLP). By observing multi-view video at training time, a proposed model learns an objectness prior that, at test time, enables the proposed model to map a single image observation to separate static "background" and movable "object" ground planes. In these aspects of the present disclosure, the proposed model is trained via self-supervised, neural rendering, without pseudo-ground truth, bounding boxes, or any instance labels.

Some aspects of the present disclosure reconstruct disentangled neural ground planes from monocular images of unbounded scenes using self-supervised learning via neural rendering. According to these aspects of the present disclosure, a proposed model enables instance segmentation, recovery of 3D object-centric representations, and 3D bounding box prediction. The proposed model may perform these tasks via a simple heuristic leveraging that connects regions of 3D space that move together and belong to the same object. The proposed representation also enables intuitive editing of the scenes using manipulation of individual objects. On a dataset of high-quality renderings of street-scale scenes, the proposed model outperforms prior pixel-aligned approaches in novel view synthesis fidelity, as well as prior work on the self-supervised discovery of object-centric 3D representations in terms of object discovery.

FIG. 1 illustrates an example implementation of the aforementioned system and method for conditional neural floorplans to enable static-dynamic disentanglement using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include sensors 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100.

In this aspect of the present disclosure, instructions loaded into a processor (e.g., CPU 102) or the NPU 108 of the ego vehicle 150 may include code to form conditional neural floorplans to enable static-dynamic disentanglement from scenes captured by the sensors 114 (e.g., a LIDAR sensor/camera). The instructions loaded into the NPU 108 may include code to extract, using a convolutional neural network (CNN), features from an image captured by the sensors 114 to form a feature tensor. The instructions loaded into the NPU 108 may also include code to resample unprojected 2D features of the feature tensor to form feature pillars. The instructions loaded into the NPU 108 may also include code to aggregate the feature pillars to form an entangled neural ground plane. The instructions loaded into the NPU 108 may further include code to decompose the entangled neural ground plane into a static neural ground plane and a dynamic neural ground plane.

Figure 2:
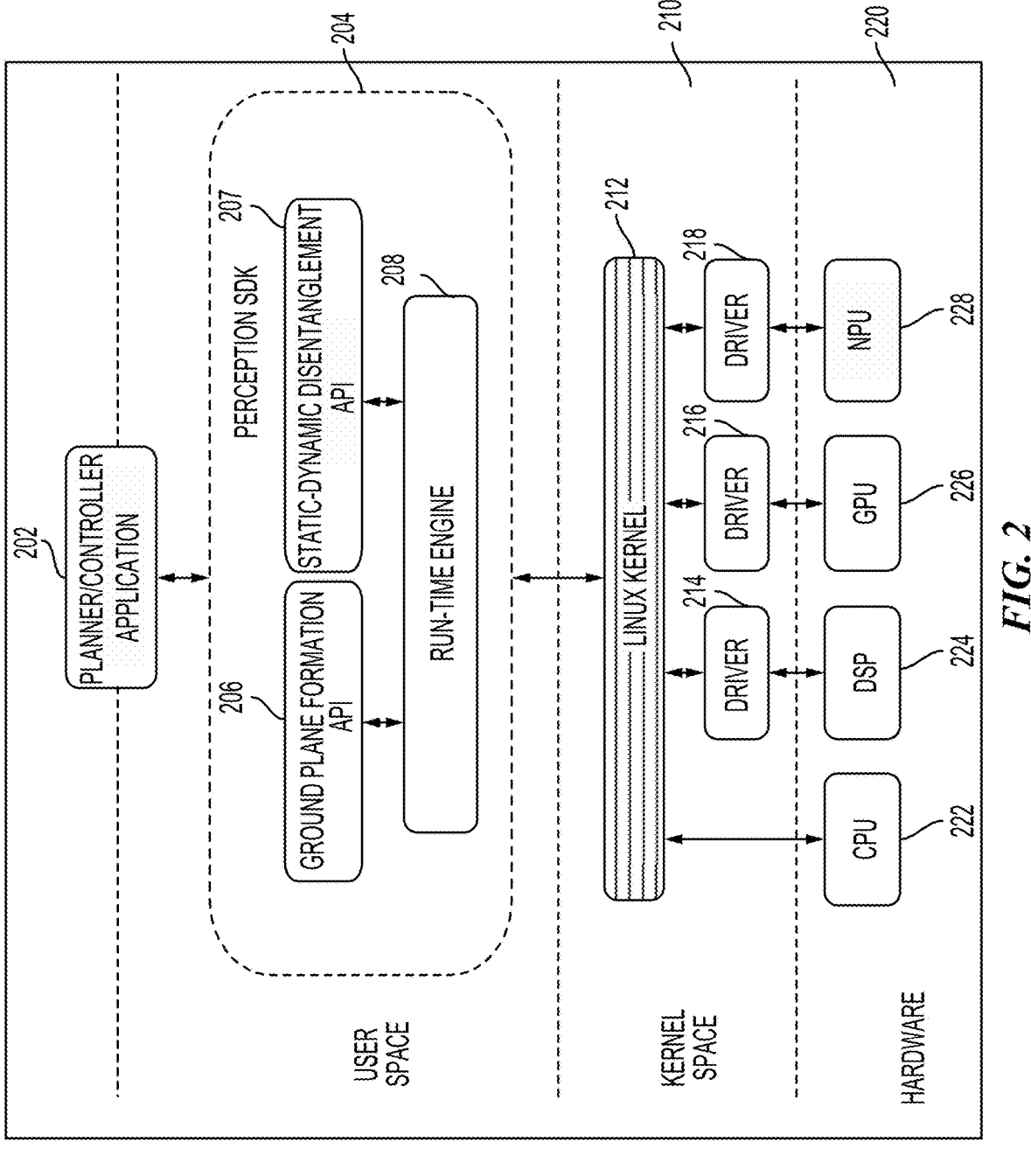
FIG. 2 is a block diagram illustrating a software architecture that may modularize functions for conditional neural floorplans to enable static-dynamic disentanglement, according to aspects of the present disclosure.

FIG. 2 is a block diagram illustrating a software architecture 200 that may modularize functions for conditional neural floorplan formation to enable static-dynamic object disentanglement, according to aspects of the present disclosure. Using the architecture, a planner/controller application 202 is designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for conditional neural floorplan formation to enable static-dynamic object disentanglement in scenes captured by a LIDAR camera of an ego vehicle. The planner/controller application 202 may make a request to compile program code associated with a library defined in a ground plane formation application programming interface (API) 206 to aggregate the feature pillars formed from resampled, unprojected 2D features of a feature tensor for forming an entangled neural ground plane. The planner/controller application 202 may make a request to compile program code associated with a library defined in a static-dynamic disentanglement API 207 to decompose the entangled neural ground plane into a static neural ground plane and a dynamic neural ground plane. The planner/controller application 202 may configure a vehicle control action by planning a trajectory of the ego vehicle according to objects within a scene surrounding the ego vehicle detected from the static and dynamic neural ground planes.

A run-time engine 208, which may be compiled code of a runtime framework, may be further accessible to the planner/controller application 202. The planner/controller application 202 may cause the run-time engine 208, for example, to perform tracking of moving objects in sequences of scenes from a camera stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
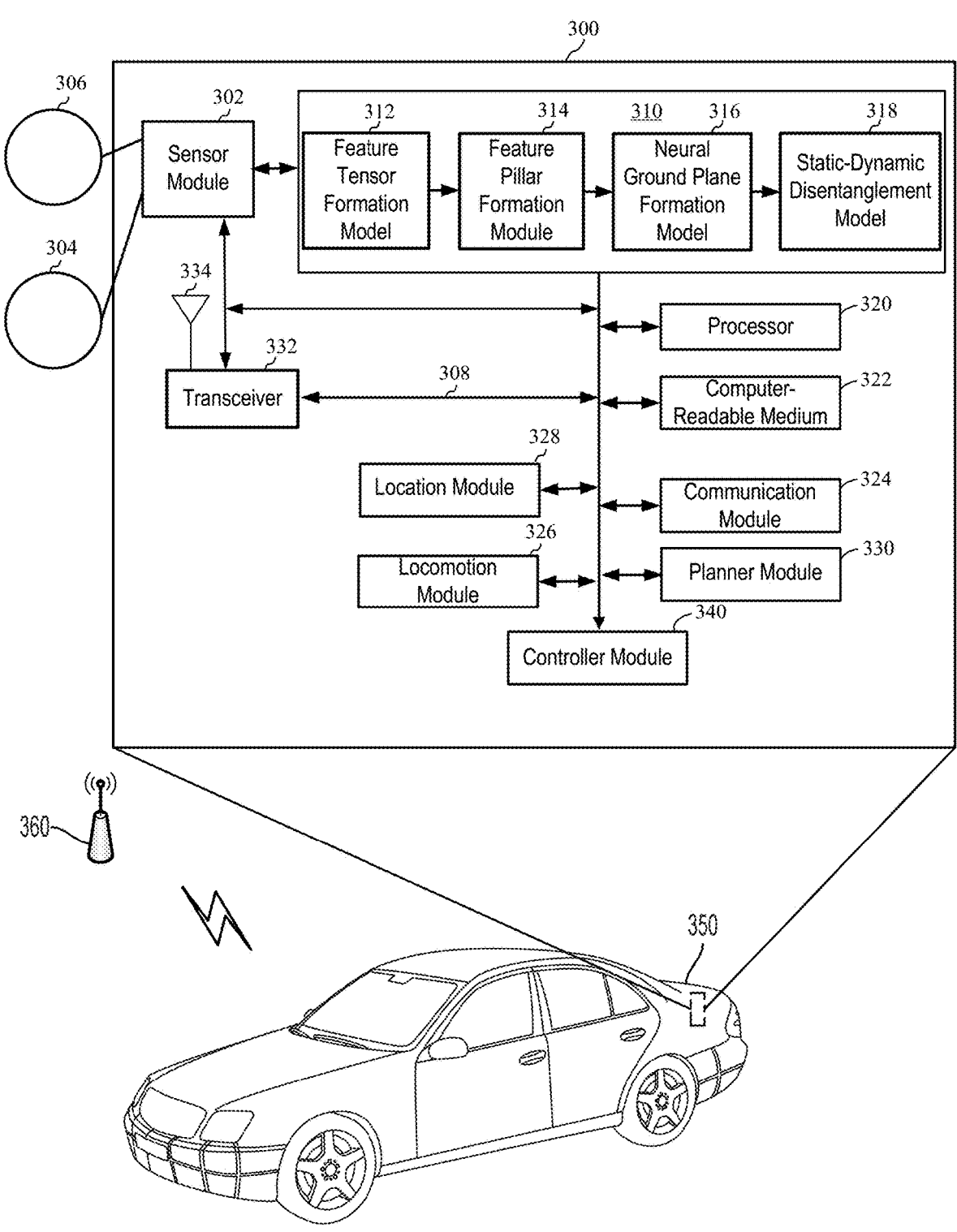
FIG. 3 is a diagram illustrating an example of a hardware implementation for conditional neural floorplans to enable static-dynamic disentanglement, according to aspects of the present disclosure.

FIG. 3 is a diagram illustrating an example of a hardware implementation for a static-dynamic object disentanglement system 300 for instance segmentation, recovery of 3D object-centric representations, and 3D bounding box prediction, according to aspects of the present disclosure. The static-dynamic object disentanglement system 300 may be configured for vehicle perception to enable planning and control of an ego vehicle in response to detected objects in scenes captured using a LIDAR camera during operation of a car 350. The static-dynamic object disentanglement system 300 may be a component of a vehicle, a robotic device, or other device. For example, as shown in FIG. 3, the static-dynamic object disentanglement system 300 is a component of the car 350. Aspects of the present disclosure are not limited to the static-dynamic object disentanglement system 300 being a component of the car 350, as other devices, such as a bus, motorcycle, or other like vehicle, are also contemplated for using the static-dynamic object disentanglement system 300. The car 350 may be autonomous or semi-autonomous.

The static-dynamic object disentanglement system 300 may be implemented with an interconnected architecture, represented generally by an interconnect 308. The interconnect 308 may include any number of point-to-point interconnects, buses, and/or bridges depending on the specific application of the static-dynamic object disentanglement system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The static-dynamic object disentanglement system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit the pseudo-labeled point cloud sequences and/or planned actions from the ego perception module 310 to a server (not shown).

The static-dynamic object disentanglement system 300 includes the processor 320 coupled to the computer-readable medium 322. The processor 320 performs processing, including the execution of software stored on the computer-readable medium 322 to provide static-dynamic object disentanglement functionality based on single images, according to aspects of the present disclosure. The software, when executed by the processor 320, causes the static-dynamic object disentanglement system 300 to perform the various functions described for ego vehicle perception based on object detection from single images captured by a LIDAR camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereo-scopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), sixth generation (6G), long term evolution (LTE), 3G, etc. The communication module 324 may also communicate with other components of the car 350 that are not modules of the static-dynamic object disentanglement system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), sixth generation (6G), long term evolution (LTE), LTE-vehicle-to-everything (V2X), LTE-driver-to-driver (D2D), Voice over LTE (VoLTE), or any other mobile data network or combination of mobile data networks. Further, the network access point 360 may include one or more IEEE 802.11 wireless networks.

The static-dynamic object disentanglement system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Human perception reliably identifies movable and immovable parts of 3D scenes, and completes the 3D structure of objects and background from incomplete observations. Humans do not learn this skill via labeled examples but, rather, simply by observing objects move. Some aspects of the present disclosure are directed to observing unlabeled multi-view videos at training time for learning to map a single image observation of a complex scene, such as a street with cars, to a 3D neural scene representation. According to these aspects of the present disclosure, the 3D neural scene representation is disentangled into movable and immovable parts while completing a 3D structure. Some aspects of the present disclosure separately parameterize movable and immovable scene parts via 2D neural ground planes. For example, these ground planes are implemented as 2D grids of features aligned with the ground plane that can be locally decoded into 3D neural radiance fields.

In some aspects of the present disclosure, a static-dynamic disentanglement model is trained using self-supervised training via neural rendering. These aspects of the present disclosure demonstrate that a structure inherent to 3D representation provided by the proposed, static-dynamic disentanglement model enable a variety of downstream tasks in street-scale 3D scenes. For example, these downstream tasks are enabled using simple heuristics, such as extraction of object-centric 3D representations, novel view synthesis, instance segmentation, and 3D bounding box prediction. These capabilities highlight the value of the proposed, static-dynamic disentanglement model as a backbone for data-efficient 3D scene understanding models. This static-dynamic disentanglement model further enables scene editing via object manipulation of a 3D representation, such as deletion, insertion, and rigid-body motion.

As shown in FIG. 3, the ego perception module 310 includes a feature tensor formation model 312, a feature pillar formation module 314, a neural ground plane formation model 316, and a static-dynamic disentanglement model 318. The feature tensor formation model 312, the feature pillar formation module 314, the neural ground plane formation model 316, and the static-dynamic disentanglement model 318 may be components of a same or different artificial neural network. For example, the artificial neural network is a convolutional neural network (CNN) communicably coupled to a LIDAR camera. The ego perception module 310 receives a single image from the first sensor 304 and/or the second sensor 306. In one configuration, the first sensor 304 and the second sensor 306 are configured as a LIDAR camera sensor.

The ego perception module 310 is configured to observing unlabeled multi-view videos at training time for learning to map a single image observation of a complex scene, such as a street with cars, to a 3D neural scene representation. In this aspect of the present disclosure, the feature tensor formation model 312 is configured to extract, using a convolutional neural network (CNN), features from an image captured by the first sensor 304 and/or the second sensor 306. In response, the feature pillar formation module 314 is configured to resample unprojected 2D features of the feature tensor to form feature pillars. Next, the neural ground plane formation model 316 is configured to aggregate the feature pillars to form an entangled neural ground plane.

In some aspects of the present disclosure, the static-dynamic disentanglement model 318 is configured to decompose the entangled neural ground plane into a static neural ground plane and a dynamic neural ground plane. Based on the static neural ground plane and the dynamic neural ground plane, the ego perception module 310 is configured to estimate 3D bounding boxes for static and dynamic objects based on movement within a scene. The static-dynamic object disentanglement system 300 may be configured for planning and control of an ego vehicle based on detected objects according to 3D bounding boxes estimated from a single image from the first sensor 304 and/or the second sensor 306 during operation of an ego vehicle, for example, as shown in FIGS. 4A and 4B.

Figure 4A:
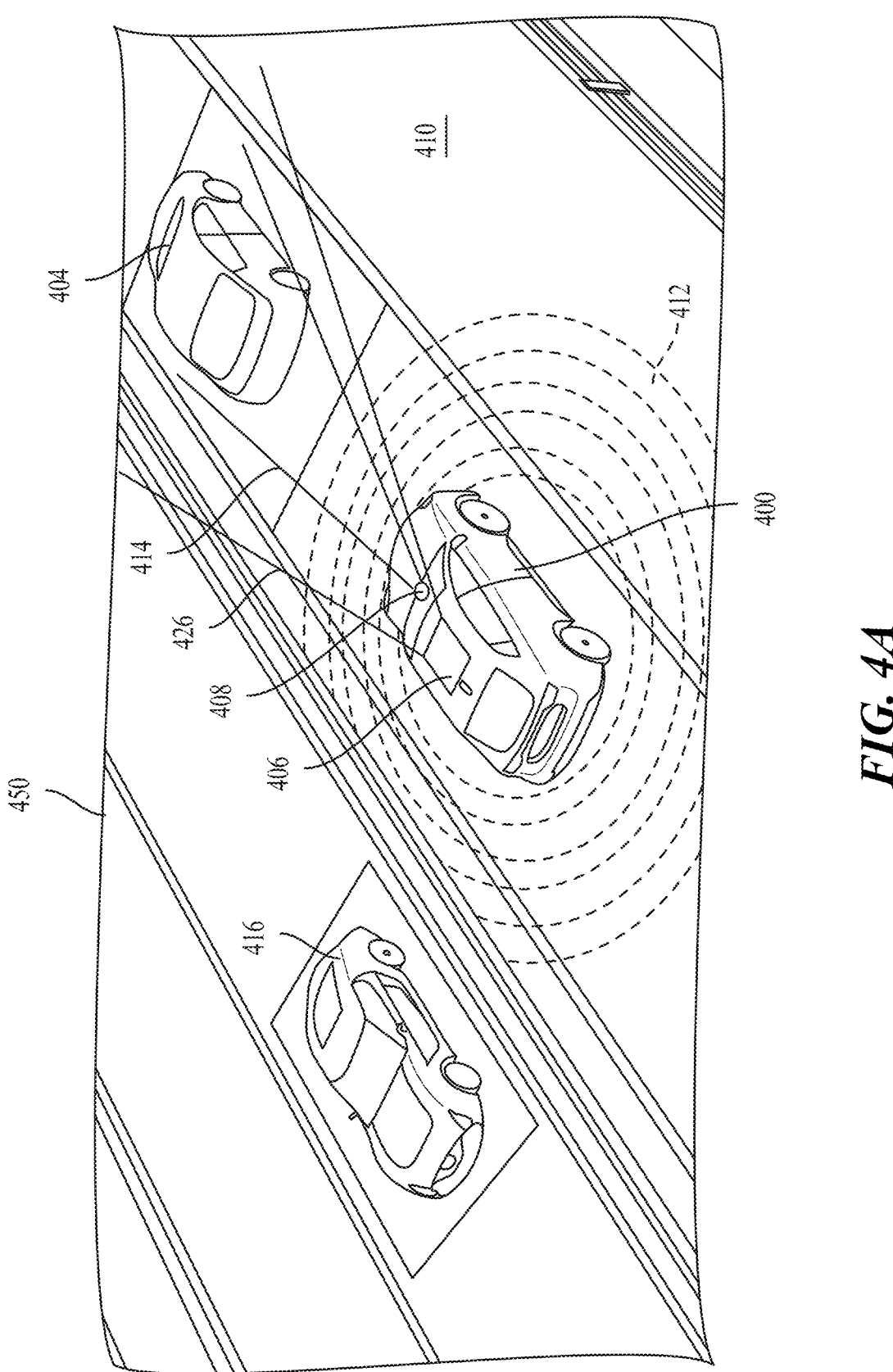
FIGS. 4A and 4B are drawings illustrating an example of an ego vehicle in an environment, according to aspects of the present disclosure.
Figure 4B:
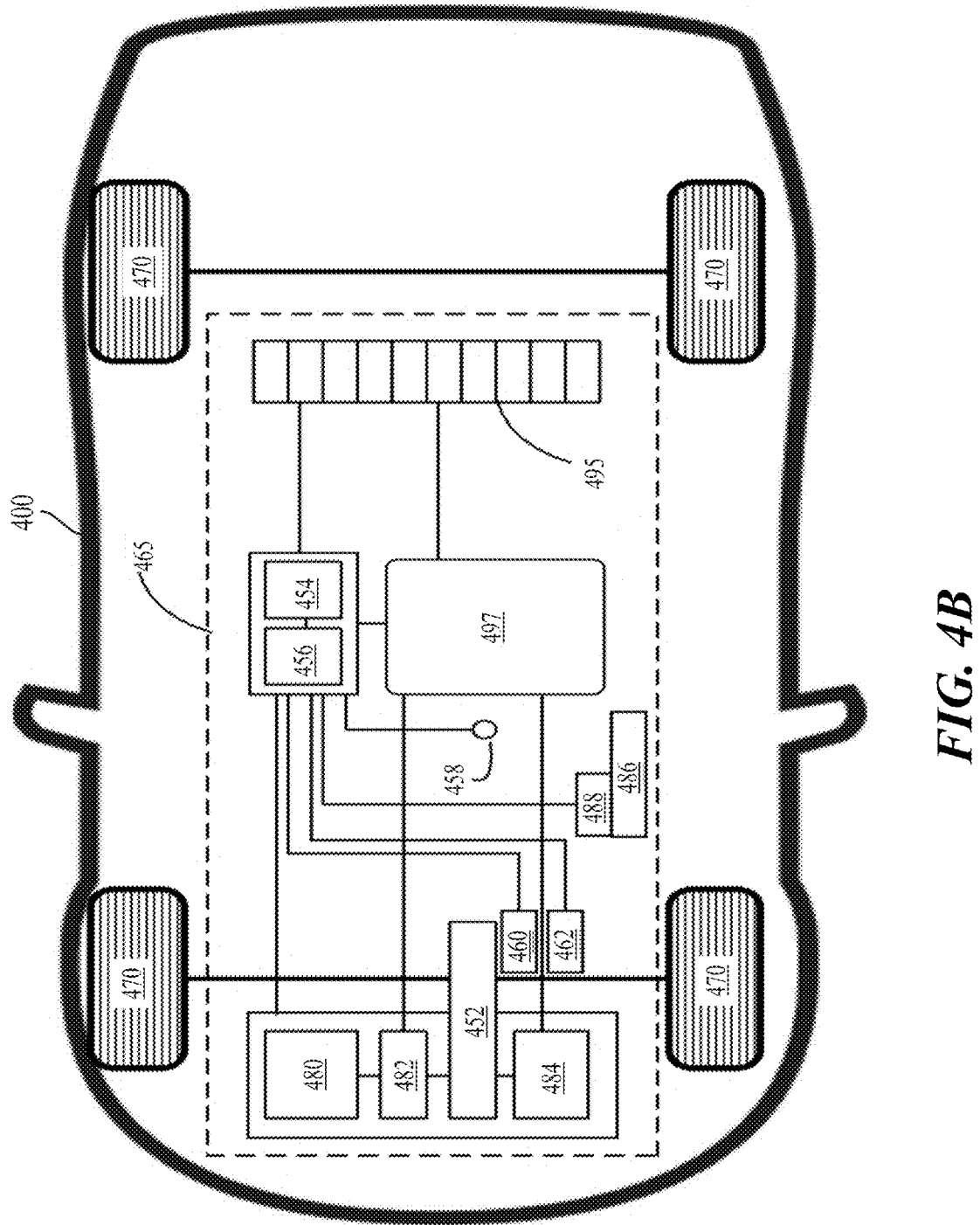

FIG. 4A illustrates an example of an ego vehicle 400 (e.g., the car 350 of FIG. 3) in an environment 450, according to aspects of the present disclosure. In the example of FIG. 4A, the vehicle may operate in either an autonomous mode, a semi-autonomous mode, or a manual mode. As shown in FIG. 4A, the ego vehicle 400 is traveling on a road 410. A first vehicle 404 (e.g., other agent) may be ahead of the ego vehicle 400, and a second vehicle 416 may be adjacent to the ego vehicle 400. In this example, the ego vehicle 400 may include a 2D camera 408, such as a 2D red-green-blue (RGB) camera, and a light detection and ranging (LIDAR) sensor 406. Alternatively, the LIDAR sensor 406 may be another RGB camera or another type of sensor, such as ultrasound, and/or a radio detection and ranging (RADAR) sensor. Additionally, or alternatively, the ego vehicle 400 may include one or more additional sensors. For example, the additional sensors may be side facing and/or rear facing sensors, which may be force measuring sensors.

In one configuration, the 2D camera 408 captures a 2D image that includes objects in the field of view 414 of the 2D camera 408. The LIDAR sensor 406 may generate LIDAR point cloud sequences, such as a 360° field of view 412 (e.g., bird's eye view). The LIDAR point cloud sequences captured by the LIDAR sensor 406 may include a 3D point cloud of the first vehicle 404, as the first vehicle 404 is in the field of view 426 of the LIDAR sensor 406. A field of view 414 of the 2D camera 408 is also shown.

The 2D image captured by the 2D camera 408 includes a 2D image of the first vehicle 404, as the first vehicle 404 is in the 2D camera's 408 field of view 414. As is known to those of skill in the art, a LIDAR sensor 406 uses laser light to sense the shape, size, and position of objects in an environment. The LIDAR sensor 406 may vertically and horizontally scan the environment. In the current example, the artificial neural network (e.g., autonomous driving system) of the ego vehicle 400 may extract height and/or depth features from the first output stream. In some examples, an autonomous driving system of the ego vehicle 400 may also extract height and/or depth features from the second output stream 424.

The information obtained from the 2D camera 408 and the LIDAR sensor 406 may be used to navigate the ego vehicle 400 along a route when the ego vehicle 400 is in an autonomous mode. The information obtained from the LIDAR sensor 406 may be used to estimate bounding boxes using a static neural ground plane and a dynamic neural ground plane. The 2D camera 408 and the LIDAR sensor 406 may be powered from electricity provided from the battery of the ego vehicle 400. The battery may also power the motor of the ego vehicle 400, as further illustrated in FIG. 4B.

FIG. 4B is a diagram further illustrating the ego vehicle 400 of FIG. 4A, in accordance with various aspects of the present disclosure. It should be understood that various aspects of the present disclosure may be directed to an autonomous vehicle. The autonomous vehicle may be an internal combustion engine (ICE) vehicle, fully electric vehicle (EV), or another type of vehicle. The ego vehicle 400 may include a drive force unit 465 and wheels 470. The drive force unit 465 may include an engine 480, motor generators (MGs) 482 and 484, a battery 495, an inverter 497, a brake pedal 486, a brake pedal sensor 488, a transmission 452, a memory 454, an electronic control unit (ECU) 456, a shifter 458, a speed sensor 460, and an accelerometer 462.

The engine 480 primarily drives the wheels 470. The engine 480 can be an ICE that combusts fuel, such as gasoline, ethanol, diesel, biofuel, or other types of fuels which are suitable for combustion. The torque output by the engine 480 is received by the transmission 452. The MGs 482 and 484 can also output torque to the transmission 452. The engine 480 and the MGs 482 and 484 may be coupled through a planetary gear (not shown in FIG. 4B). The transmission 452 delivers an applied torque to one or more of the wheels 470. The torque output by the engine 480 does not directly translate into the applied torque to the one or more wheels 470.

The MGs 482 and 484 can serve as motors which output torque in a drive mode, and can serve as generators to recharge the battery 495 in a regeneration mode. The electric power delivered from or to the MGs 482 and 484 passes through the inverter 497 to the battery 495. The brake pedal sensor 488 can detect pressure applied to the brake pedal 486, which may further affect the applied torque to the wheels 470. The speed sensor 460 is connected to an output shaft of the transmission 452 to detect a speed input which is converted into a vehicle speed by the ECU 456. The accelerometer 462 is connected to the body of the ego vehicle 400 to detect the actual deceleration of the ego vehicle 400, which corresponds to a deceleration torque.

The transmission 452 may be a transmission suitable for any vehicle. For example, the transmission 452 can be an electronically controlled continuously variable transmission (ECVT), which is coupled to the engine 480 as well as to the MGs 482 and 484. The transmission 452 can deliver torque output from a combination of the engine 480 and the MGs 482 and 484. The ECU 456 controls the transmission 452, utilizing data stored in the memory 454 to determine the applied torque delivered to the wheels 470. For example, the ECU 456 may determine that at a certain vehicle speed, the engine 480 should provide a fraction of the applied torque to the wheels 470 while one or both of the MGs 482 and 484 provide most of the applied torque. The ECU 456 and the transmission 452 can control an engine speed (NE) of the engine 480 independently of the vehicle speed (V).

The ECU 456 may include circuitry to control the above aspects of vehicle operation. Additionally, the ECU 456 may include, for example, a microcomputer that includes one or more processing units (e.g., microprocessors), memory storage (e.g., RAM, ROM, etc.), and I/O devices. The ECU 456 may execute instructions stored in memory to control one or more electrical systems or subsystems in the ego vehicle 400. Furthermore, the ECU 456 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 482 and 484 each may be a permanent magnet type synchronous motor including, for example, a rotor with a permanent magnet embedded therein. The MGs 482 and 484 may each be driven by an inverter controlled by a control signal from the ECU 456, so as to convert direct current (DC) power from the battery 495 to alternating current (AC) power, and supply the AC power to the MGs 482 and 484. In some examples, a first MG 482 may be driven by electric power generated by a second MG 484. It should be understood that in embodiments where MGs 482 and 484 are DC motors, no inverter is required. The inverter 497, in conjunction with a converter assembly, may also accept power from one or more of the MGs 482 and 484 (e.g., during engine charging), convert this power from AC back to DC, and use this power to charge the battery 495 (hence the name, motor generator). The ECU 456 may control the inverter 497, adjust driving current supplied to the first MG 482, and adjust the current received from the second MG 484 during regenerative coasting and braking.

The battery 495 may be implemented as one or more batteries or other power storage devices including, for example, lead-acid batteries, lithium ion and nickel batteries, capacitive storage devices, and so on. The battery 495 may also be charged by one or more of the MGs 482 and 484, such as, for example, by regenerative braking or coasting, during which one or more of the MGs 482 and 484 operates as a generator. Alternatively, or additionally, the battery 495 can be charged by the first MG 482, for example, when the ego vehicle 400 is idle (not moving/not in drive). Further still, the battery 495 may be charged by a battery charger (not shown) that receives energy from the engine 480. The battery charger may be switched or otherwise controlled to engage/disengage it with the battery 495. For example, an alternator or generator may be coupled directly or indirectly to a drive shaft of the engine 480 to generate an electrical current as a result of the operation of the engine 480. Still other embodiments contemplate the use of one or more additional motor generators to power the rear wheels of the ego vehicle 400 (e.g., in vehicles equipped with 4-Wheel Drive), or using two rear motor generators, each powering a rear wheel.

The battery 495 may also power other electrical or electronic systems in the ego vehicle 400. In some examples, the battery 495 can include, for example, one or more batteries, capacitive storage units, or other storage reservoirs suitable for storing electrical energy that can be used to power one or both of the MGs 482 and 484. When the battery 495 is implemented using one or more batteries, the batteries can include, for example, nickel metal hydride batteries, lithium ion batteries, lead acid batteries, nickel cadmium batteries, lithium ion polymer batteries, or other types of batteries.

The ego vehicle 400 may operate in one of an autonomous mode, a manual mode, or a semi-autonomous mode. In the manual mode, a human driver manually operates (e.g., controls) the ego vehicle 400. In the autonomous mode, an autonomous control system (e.g., autonomous driving system) operates the ego vehicle 400 without human intervention. In the semi-autonomous mode, the human may operate the ego vehicle 400, and the autonomous control system may override or assist the human. For example, the autonomous control system may override the human to prevent a collision or to obey one or more traffic rules.

Parsing a scene into movable objects and an immovable background is an important aspect of visual perception for the ego vehicle 400. Humans succeed at this task of parsing a scene into movable objects and an immovable background given just a single, static image. Furthermore, human perception is capable of completing the 3D geometry of occluded portions of objects, such as a mug or a car, given a partial observation from a single viewpoint. These fundamental skills of scene understanding are largely self-supervised, and learned simply by moving in and interacting with a 3D environment. A self-supervised approach that learns to reconstruct representations of 3D scenes that disentangle a static background from movable objects, while completing occluded regions, is desired.

Aspects of the present disclosure recognize that motion is an important cue to learn as a prior for object discovery, while leveraging motion as an objectness cue and training on multi-view videos. Some aspects of the present disclosure learn to map a single image to a 3D neural scene representation that is disentangled into a static background and movable object 3D representations. Specifically, given a single image, some aspects of the present disclosure provide a model that infers a neural ground plane, including a 2D grid of learned features aligned with the ground plane. As described, neural ground planes exploit the fact that in scenes with physical objects, the physical objects move mostly under their own power, such as streets with cars, pedestrians, and bicyclists. As a consequence of gravity, most of these objects move on a 2D ground plane. For example, a neural ground plane offers a dense, yet memory-efficient, neural scene representation.

In these aspects of the present disclosure, continuous 3D points are decoded for volume rendering by projecting the continuous 3D points on the neural ground plane, retrieving the respective features, and decoding the respective features using multilayer perception (MLP). By observing multi-view video at training time, a proposed model learns an objectness prior that, at test time, enables the proposed model to map a single image observation to separate static "background" and movable "object" ground planes. In these aspects of the present disclosure, the proposed model is trained via self-supervised, neural rendering, without pseudo-ground truth, bounding boxes, or any instance labels.

Some aspects of the present disclosure reconstruct disentangled neural ground planes from monocular images of unbounded scenes using self-supervised learning via neural rendering. According to these aspects of the present disclosure, a proposed model enables instance segmentation, recovery of 3D object-centric representations, and 3D bounding box prediction. The proposed model may perform these tasks via a simple heuristic leveraging that connects regions of 3D space that move together and belong to the same object. The proposed representation also enables intuitive editing of the scenes using manipulation of individual objects. On a dataset of high-quality renderings of street-scale scenes, the proposed model outperforms prior pixel-aligned approaches in novel view synthesis fidelity, as well as prior work on the self-supervised discovery of object-centric 3D representations in terms of object discovery, for example, as shown in FIG. 5.

Figure 5:
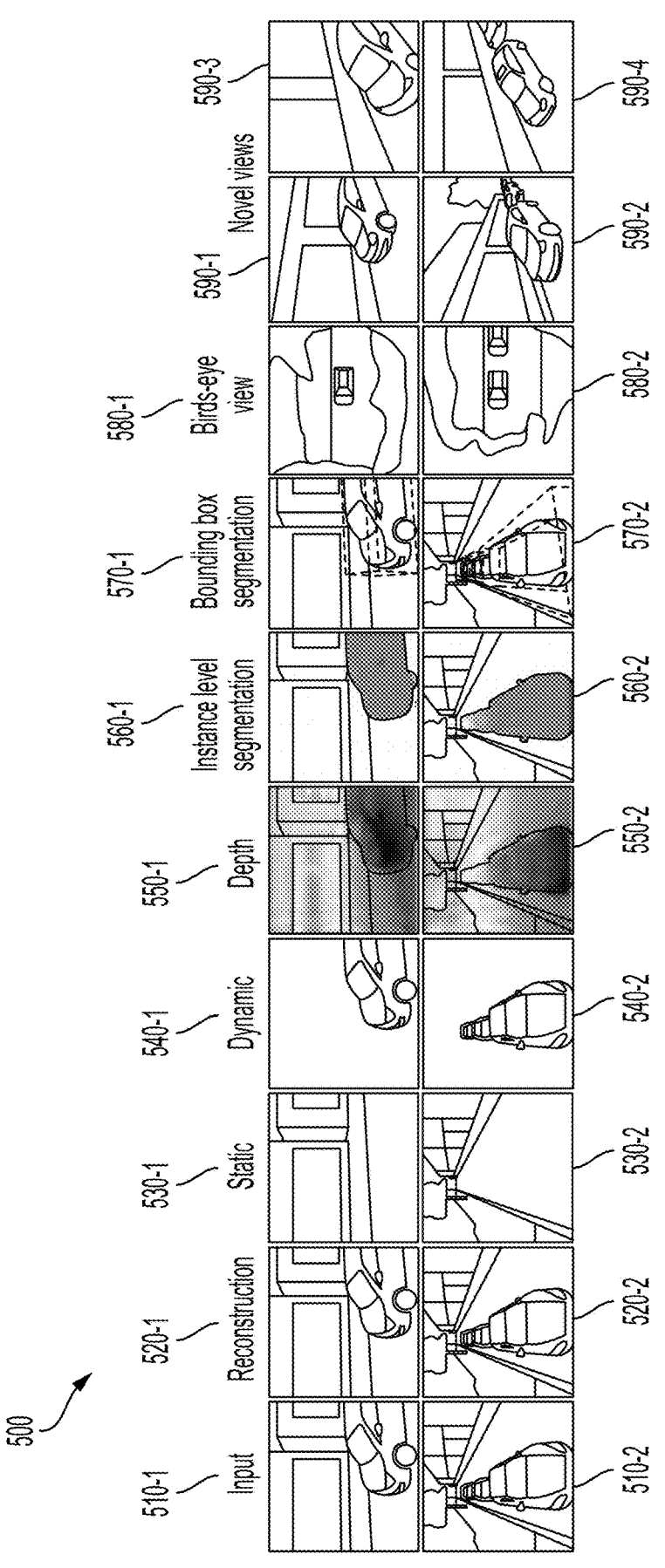
FIG. 5 illustrates inference of separate 3D representations for static and dynamic scene elements, including instance segmentation, 3D bounding box prediction, 3D scene editing, and the extraction of object-centric 3D representations, according to aspects of the present disclosure.

FIG. 5 illustrates separate 3D representations for static and dynamic scene elements, including instance segmentation, 3D bounding box prediction, 3D scene editing, and the extraction of object-centric 3D representations, according to aspects of the present disclosure. Some aspects of the present disclosure are directed to unsupervised object detection and extracting object-centric 3D representations. These aspects of the present disclosure yield a model that maps a single image to two radiance fields by parameterizing static and dynamic 3D regions, respectively.

For example, as shown in FIG. 5, input images 510 (510-1, 510-2) are processed to generate reconstructions 520 (520-1, 520-2) for separating static representations 530 (530-1, 530-1) and dynamic representations 540 (540-1, 540-2). In some aspects of the present disclosure, depth maps 550 (550-1, 550-2) are formed based on the separations of the static representations 530 (530-1, 530-2) from the dynamic representations 540 (540-1, 540-2). In these aspects of the present disclosure, the depth maps 550 (550-1, 550-2) enable the formation of instance level segmentations 560 (560-1, 560-2), bounding box segmentations 570 (570-1, 570-2), birds-eye views 580 (580-1, 580-2), and novel views 590 (590-1, 590-2, 590-3, 590-4).

As shown in FIG. 5, a simple search for connected components in the dynamic neural ground plane enables performing of unsupervised 3D instance segmentation, monocular 3D bounding box prediction, and the extraction of object-centric 3D representations. Specifically, given a dynamic ground plane, aspects of the present disclosure first sample points in a 3D grid around the ground plane origin and decode the sample point's densities. Next, a connected-component labeling is performed in the ground plane space using accumulated density values for identifying disconnected dynamic objects. Using volume rendering, these aspects of the present disclosure perform screen-space, instance level segmentations 560 (560-1, 560-2). In addition, 3D bounding boxes for each of the instance level segmentations 560 (560-1, 560-2) are extracted by recovering the smallest of the bounding box segmentations 570 (570-1, 570-2) containing some percentage of the total density of the connected component. Finally, these aspects of the present disclosure crop tiles of the dynamic ground plane that belong to a given object instance, yielding object-centric 3D representations, enabling editing of 3D scenes such as insertion, rigid-body transformation, and deletion of objects. Those skilled in the art recognize that this approach is not limited to a fixed number of objects during training or at test time.

Conditional Neural Ground Planes

Figures 6A, 6B, 6C:
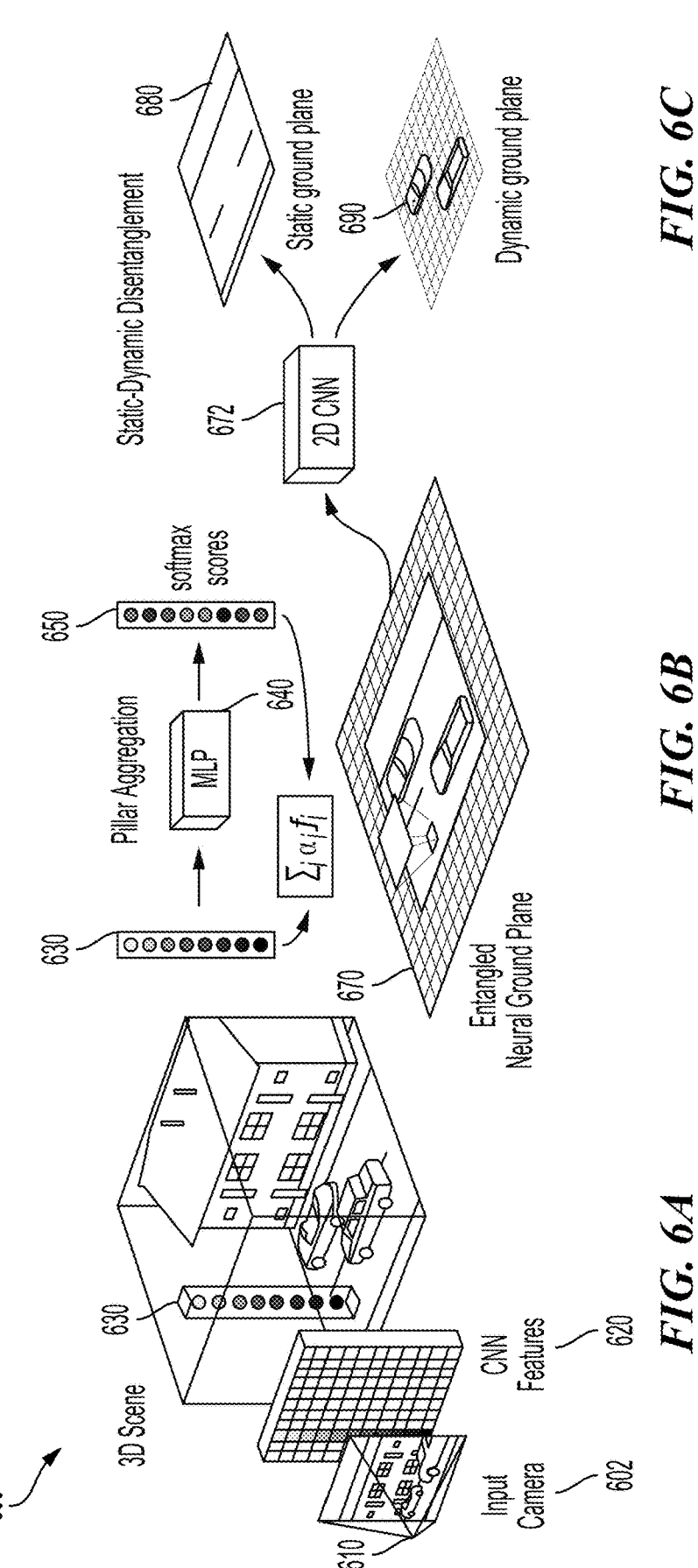
FIGS. 6A-6C are block diagrams illustrating conditional neural ground planes to provide a hybrid discrete-continuous scene representation for 3D scene understanding, reconstructed from single images and trained via multi-view video, according to aspects of the present disclosure.

FIGS. 6A-6C are block diagrams illustrating conditional neural ground planes to provide a hybrid discrete-continuous scene representation for 3D scene understanding, reconstructed from single images and trained via multi-view video, according to aspects of the present disclosure. The examples provided below first describe the conditional neural ground plane without static-dynamic disentanglement. An entangled neural ground plane is described with reference to FIGS. 7A-7D, according to aspects of the present disclosure.

Compacted Neural Ground Planes for Unbounded Scene Representations

FIGS. 6A-6C illustrate the reconstruction of a neural ground plane from a single image, according to aspects of the present disclosure. As described, a neural ground plane is a 2D grid of features aligned with the ground plane of a 3D scene 600 of FIG. 6A, which is defined as the xz-plane. As shown in FIG. 6A, a 3D point from a context image 610 captured by an input camera 602 is decoded by projecting the 3D point onto a ground plane and retrieving a corresponding feature vector (such as CNN features 620) using bilinear interpolation. The CNN features 620 are then concatenated with a vertical y-coordinate of the query point and decoded into radiance and density values via a fully connected network, enabling novel view synthesis using volume rendering.

In some aspects of the present disclosure, however, it is only possible to decode 3D points that lie within the boundaries of the neural ground plane, which precludes reconstruction and representation of unbounded scenes. These aspects of the present disclosure compact $R^2$ by implementing a non-linear coordinate re-mapping. In this example, xz-coordinates within a radius $r_{inner}$ around the ground plane origin remain unaffected, but xz-coordinates of points outside this radius are contracted. For any point $p \in R^2$ on the ground plane, the contracted coordinate can be computed as $p' = ((1+k)-k/\|u\|)(u/\|u\|)r_{inner}$, where $u = p/r_{inner}$, and $k$ is a hyperparameter which controls the size of the contracted region.

Parameterizing the 3D scene 600 as 2D neural ground planes provides several advantages over alternative scene representations. Compared to parameterizing the entire 3D scene 600 as a single, monolithic multilayer perception (MLP), rendering is significantly cheaper, as in other hybrid discrete-continuous neural fields. Those skilled in the art should recognize that while it is possible for a feature to parameterize more than one object per tile, it is difficult to reconstruct stacks of unseen numbers of objects. When reasoning about dynamics, the neural ground plane encodes an inductive bias that most motion happens in the ground plane. In applications such as self-driving, a ground plane is an appropriate memory-efficient representation. For other tasks, such as stacking of boxes, it is prudent to expand the ground plane to a voxelgrid along they-axis. A core benefit of both voxelgrids and ground planes as 3D representations is that they enable shift-equivariant processing of the 3D scene via convolutions, without concern for occlusions and perspective distortion, and enable straight-forward editing of the 3D scene.

Reconstructing Neural Ground Planes from Images

As shown in FIGS. 6A-6C, inferring a neural ground plane from one or several images proceeds in three steps: (1) feature extraction, (2) feature unprojection, and (3) pillar aggregation. For example, given a single image I, per-pixel features are extracted using a (CNN) encoder to yield a feature tensor F. In this example, an input camera 602 is defined as the world origin and center of the neural ground plane accordingly, approximately aligned with the ground level. As shown in FIG. 6A, given a context image 610 captured by the input camera 602, a set of CNN features 620 are extracted. Next, the CNN features 620 are unprojected into 3D and re-sampled as pillar 630 on top of a location of ground plane vertices. As shown in FIG. 6B, the pillar 630 is aggregated into ground plane features on an entangled neural ground plane 670 by a multilayer perception (MLP) 640 using a softmax-weighted sum of softmax scores 650. As shown in FIG. 6C, the resulting 2D grid of features represented by the entangled neural ground plane 670 is decomposed and separated into a static ground plane 680 and a dynamic ground plane 690 using a 2D CNN 672. A coordinate-encoding MLP block is not visualized in FIGS. 6A-6C.

In some aspects of the present disclosure, the CNN features 620 are unprojected along their respective rays as parameterized via the intrinsic and extrinsic parameters of the input camera 602 to create a discrete volume in the world space v, where $v(x)=F(\pi(x))$ at a 3D grid point x on the volume, and $\pi(\cdot)$ is the projection operation. In this example, the xz-coordinates of this volume are aligned with ground plane representation. In addition, at any vertex of the entangled neural ground plane 670, the discretized y-coordinates of the volume form the pillar 630. The next steps shown in FIG. 6B to aggregate the pillar 630 into a point in order to create the 2D entangled neural ground plane 670.

As shown in FIG. 6B, a coordinate-encoding MLP (not shown) transforms the volume as $f(x)=D(v(x), x_c, d)$, where the function $D(\cdot)$ denotes the MLP, $x_c$ denotes the camera-space coordinates of the 3D grid point, and d denotes the ray direction from the camera center to x. Because features along a camera ray are identical in v, coordinate encoding is used to add the depth information to the CNN features 620. If access is available to multi-view input images, the volumes corresponding to each input view are mean pooled at this point. Associated with each 2D vertex of the entangled neural ground plane 670 is a set of features $$\{f_i\}_{i=1}^N,$$

where N is the length of the y-dimension in the volume. In this example, the MLP 640 performs pillar-aggregation to compute the softmax scores 650 as $\alpha_i=P(f_i, x_i)$, where $P(\cdot)$ denotes the MLP 640 and $x_i$ is the coordinate of the i-th point on the pillar 630. Finally, the features are aggregated as $g=\Sigma_i \alpha_i f_i$.

Differentiable Rendering

Some aspects of the present disclosure render images from novel camera views via differentiable volume rendering. To resolve points closer to the camera more finely, logarithmic sampling of points is performed along a ray with more samples close to the camera. For each sampled point x on the camera ray, density and color are computed for volume rendering. This is accomplished using a rendering MLP, as $(c_x, \sigma_x)=R(g_x, y_x)$, where $R(\cdot)$ denotes the MLP, $g_x$ are the ground plane features for the point x computed by projecting the coordinates onto the ground plane and bilinearly interpolating the nearest grid points, and $y_x$ is the height at the projected point on the ground plane. The rendering MLP enables a full 3D reconstruction using the ground plane.

Learning Static-Dynamic Disentanglement

Figures 7A, 7B, 7C, 7D:
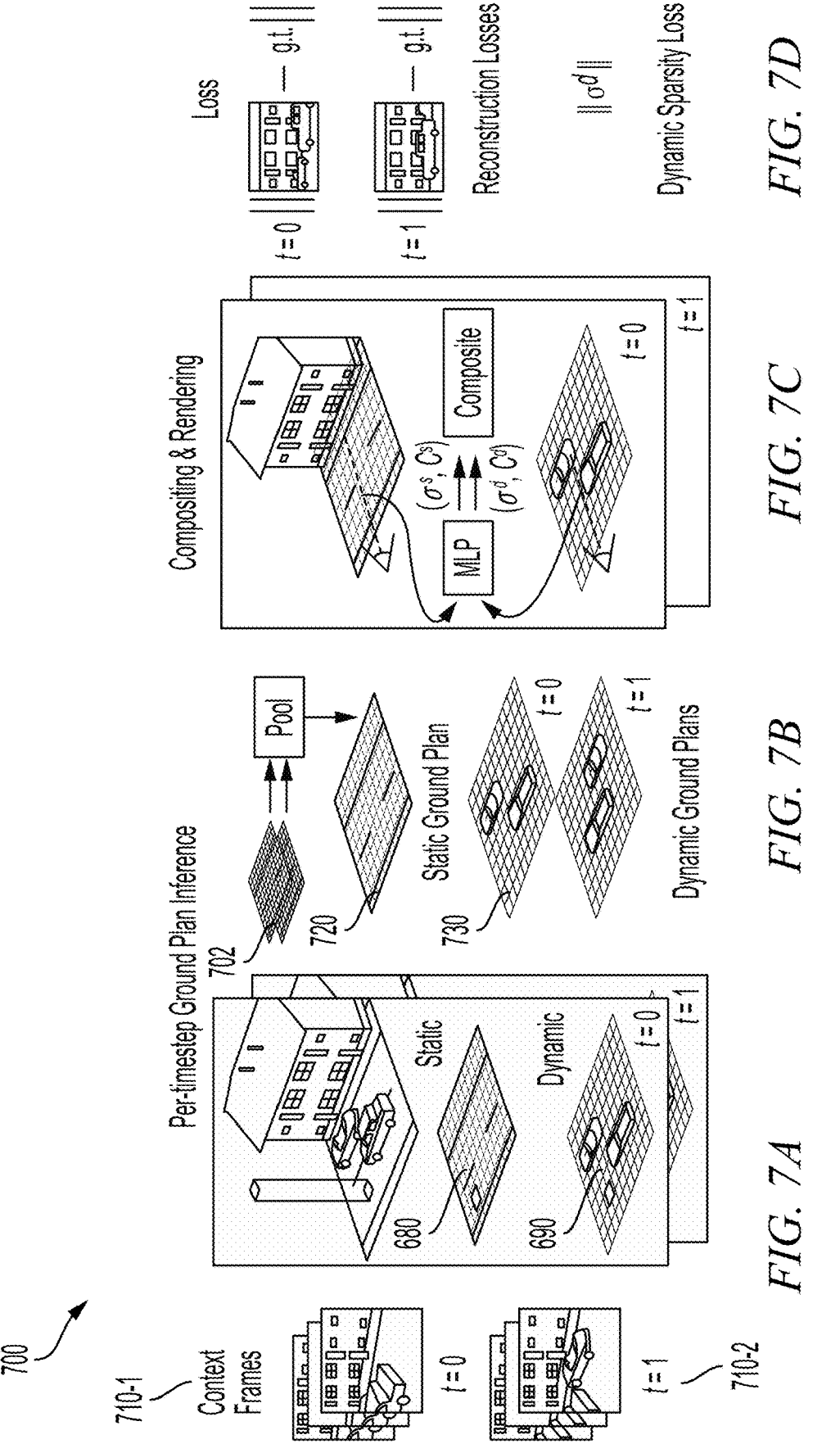
FIGS. 7A-7D are block diagrams illustrating a process for learning static-dynamic disentanglement, according to aspects of the present disclosure.

FIGS. 7A-7D are block diagrams illustrating a process 700 for learning static-dynamic disentanglement, according to aspects of the present disclosure. Referring to FIG. 7A, given multiple ones of context frames 710 (710-1, 710-2) of video, a compactified, static ground plane 680 and the dynamic ground plane 690 are extracted per each of the context frames 710, for example, as shown in FIG. 6C. As shown in FIG. 7B, the static ground plane 680 is pooled into a time-invariant static ground plane, illustrated with per frame, dynamic ground planes 730. According to the process 700, FIG. 7C illustrates compositing of the per-frame, dynamic ground planes 730 and the time-invariant, static ground plane 720 via differentiable volume rendering. As shown in FIG. 7D, the proposed model is supervised via a re-rendering loss on video frames. The model is configured to explain the scene density with the static ground plane via a sparsity loss on per-frame dynamic volume rendering densities. The surface loss is not visualized in FIG. 7D.

The process 700 shown in FIGS. 7A-7D describes how motion over time is leveraged to disentangle dynamic and static scene parts, and how the resulting scene representation is used for self-supervised 3D object discovery and 3D bounding box prediction in street scenes via a simple heuristic. The process 700 shown in FIGS. 7A-7D illustrates a multi-frame training for dynamic-static disentanglement, according to aspects of the present disclosure.

In some aspects of the present disclosure the process of disentangling static and dynamic neural ground planes shown in FIGS. 7A-7D leverages multi-view video as the training signal, such as the context frames 710 (710-1, 710-2) of FIG. 7A. In this example, two frames of a video are selected. For each frame of the context frames 710 (710-1, 710-2), the entangled neural ground plane 670 is inferred, as described in FIGS. 6A-6C. Features in this entangled neural ground plane 670 parameterize both static and dynamic features of the scene, for instance, a car as well as the road below it. As shown in FIG. 6C, the entangled neural ground plane 670 is fed into the 2D CNN 672, which is a fully convolutional 2D network that disentangles the entangled neural ground plane 670 into the static ground plane 680 and the dynamic ground plane 690, containing static and dynamic features. As shown in FIG. 7B, per-frame static ground planes 702 are pooled to obtain a single time-independent, static ground plane 720.

Referring again to FIGS. 6A-6C, The xz-coordinates in the entangled neural ground plane 670 are linearly spaced. As shown in FIG. 6C, the 2D CNN 672 also transforms the entangled neural ground plane 670 to the compactified PZ' space, as described above. Vertices in this compactified space are arranged on regular grids close to the camera and grow increasingly sparse with increasing distance. It is noted that the 2D CNN 672 in the ground plane space is a 3D operation, because ground planes implicitly parameterize 3D scene representations.

Compositing Ground Planes.

Referring again to FIGS. 7A-7D, rendering a disentangled scene into the static ground plane 680 and the dynamic ground plane 690 involves decoding query points using both the static ground plane 680 and the dynamic ground plane 690. In this example, decoding the query points using both the static ground plane 680 and the dynamic ground plane 690 yields two sets of values (density, color) for each point. As shown in FIG. 7C, the contribution from static and dynamic components are composed along the ray. Given the color and density for static ($c^S$, $\sigma^S$) and dynamic ($c^D$, $\sigma^D$) parts, the density of the combined scene is calculated as $\sigma^S+\sigma^D$. The color at the sampled point is computed as a weighted linear combination $w^S c^S+w^D c^D$ where $w^S=(1-\exp(-\delta\sigma^S))/(1-\exp(-\delta(\sigma^S+\sigma^D)))$, $w^D=(1-\exp(-\delta\sigma^D))/(1-\exp(-\delta(\sigma^S+\sigma^D)))$, and $\delta$ is the distance between adjacent samples on the camera ray.

Losses and Training.

As shown in FIG. 7D, the proposed model is trained on multi-view video, where multi-view information is used to learn a 3D structure, while motion is used to disentangle the static and dynamic components in the scene. During training, two time-steps are sampled per video. For each time-step, multiple images are sampled from different camera views; and some of the views are used as input to the method while others are used to compute the loss function. The input images may be used to infer static and dynamic ground planes, which are used to render out per-frame query views. In one example, per-frame loss consists of an image reconstruction term, a hard surface constraint, and a sparsity term.

$$\mathcal{L} = \tag{1}$$

$$\underbrace{\|R-I\|_2^2 + \lambda_{LPIPS}\mathcal{L}_{LPIPS}(R,I)}_{\mathcal{L}_{img}} - \underbrace{\lambda_{surface}\sum_i \log(\mathbb{P}(w_i))}_{\mathcal{L}_{surface}} + \underbrace{\lambda_{sparse}\sum_i |\sigma_i^D|}_{\mathcal{L}_{dyn\_sparcity}}.$$

In this example, $\mathcal{L}_{img}$ measures the difference between the rendered and ground truth images, R and I respectively, using a combination of $\ell_2$ and patch-based LPIPS perceptual loss. $\mathcal{L}_{surface}$ encourages both static and dynamic weight values (the weight for each sample in the rendering equation) $w_i$ for all samples along the rendered rays to be either 0 or 1, encouraging hard surfaces [79]. Here, $\mathbb{P}(w_i)$ $=\exp(-|w_i|)+\exp(-|1-w_i|)$. The sparsity term $\mathcal{L}_{dyn\_sparsity}$ takes as input densities decoded from the dynamic ground plane from all rendered rays, and encourages the values to be sparse. This forces the model to explain as much non-empty 3D structure as possible via the static ground plan, leading to reliable static-dynamic disentanglement. Without this loss, the model could explain the entire scene with just the dynamic component. The loss functions are weighted using the hyper-parameters $\lambda_{LPIPS}$, $\lambda_{surface}$, and $\lambda_{sparse}$. While we describe the loss functions for a single sample of ground-truth and rendered image, in practice, we construct mini-batches by randomly choosing multiple views of a scene at different time steps, and evaluate the loss function on each sample.

Some aspects of the present disclosure yield a model that maps a single image to two radiance fields, parameterizing static and dynamic 3D regions respectively. These aspects of the present disclosure perform a simple search for connected components in a dynamic neural ground plane, as well as unsupervised 3D instance segmentation, monocular 3D bounding box prediction, and the extraction of object-centric 3D representations. For example, as shown in FIG. 5, the input images 510 (510-1, 510-2) are processed to generate the reconstructions 520 (520-1, 520-2) for separating the static representations 530 (530-1, 530-2) and the dynamic representations 540 (540-1, 540-2). In some aspects of the present disclosure, the depth maps 550 (550-1, 550-2) are formed based on the separations of the static representations 530 (530-1, 530-2) from the dynamic representations 540 (540-1, 540-2). In these aspects of the present disclosure, the depth maps 550 (550-1, 550-2) enable the formation of the instance level segmentations 560 (560-1, 560-2), the bounding box segmentations 570 (570-1, 570-2), the birds-eye views 580 (580-1, 580-2), and the novel views 590 (590-1, 590-2, 590-3, 590-4).

Using volume rendering, these aspects of the present disclosure perform screen-space, instance level segmentations 560 (560-1, 560-2). In addition, 3D bounding boxes for each of the instance level segmentations 560 (560-1, 560-2) are extracted by recovering the smallest of the bounding box segmentations 570 (570-1, 570-2) containing some percentage of the total density of the connected component. Finally, these aspects of the present disclosure crop tiles of the dynamic ground plane that belong to a given object instance, yielding object-centric 3D representations, enabling editing of 3D scenes such as insertion, rigid-body transformation, and deletion of objects. Those skilled in the art recognize that this approach is not limited to a fixed number of objects during training or at test time. This process for unsupervised object detection and extracting object-centric 3D representations may be performed, for example, as shown in FIG. 8.

FIG. 8 is a flowchart illustrating a method of conditional neural ground planes for static-dynamic disentanglement, according to aspects of the present disclosure. The method 800 begins at block 802, in which features are extracted from an image to form a feature tensor using a convolutional neural network (CNN). For example, as shown in FIG. 6A, a 3D point from a context image 610 captured by an input camera 602 is decoded by projecting the 3D point onto a ground plane and retrieving a corresponding feature vector (such as CNN features 620) using bilinear interpolation. That is, given the context image 610 captured by the input camera 602, the set of CNN features 620 are extracted.

At block 804, unprojected 2D features of the feature tensor are resampled to form feature pillars. For example, as further illustrated in FIG. 6A, the CNN features 620 are unprojected into 3D and re-sampled as the pillar 630 on top of a location of ground plane vertices. In particular, the CNN features 620 are unprojected along their respective rays as parameterized via the intrinsic and extrinsic parameters of the input camera 602 to create a discrete volume in the world space v, where $v(x)=F(\pi(x))$ at a 3D grid point x on the volume, and ire) is the projection operation. In this example, the xz-coordinates of this volume are aligned with ground plane representation. In addition, at any vertex of the entangled neural ground plane 670, the discretized y-coordinates of the volume form the pillar 630.

At block 806, the feature pillars are aggregated to form an entangled neural ground plane. For example, as shown in FIG. 6B, the pillar 630 is aggregated into ground plane features on an entangled neural ground plane 670 by a multilayer perception (MLP) 640 using a softmax-weighted sum of softmax scores 650. As further shown in FIG. 6B, a coordinate-encoding MLP (not shown) transforms the volume as $f(x)=D(v(x), x_c, d)$, where the function $D(\cdot)$ denotes the MLP, $x_c$ denotes the camera-space coordinates of the 3D grid point, and d denotes the ray direction from the camera center to x. Because features along a camera ray are identical in v, coordinate encoding is used to add the depth information to the CNN features 620. If access is available to multi-view input images, the volumes corresponding to each input view are mean pooled at this point. Associated with each 2D vertex of the entangled neural ground plane 670 is a set of features $$\{f_i\}_{i=1}^{N},$$

where N is the length of the y-dimension in the volume. In this example, the MLP 640 performs pillar aggregation to compute the softmax scores 650 as $\alpha_i = P(f_i, x_i)$, where $P(\cdot)$ denotes the MLP 640 and $x_i$ is the coordinate of the i-th point on the pillar 630. Finally, the features are aggregated as $g = \Sigma_i \alpha_i f_i$.

At block 808, the entangled neural ground plane is decomposed into a static neural ground plane and a dynamic neural ground plane. For example, as shown in FIG. 6C, the resulting 2D grid of features represented by the entangled neural ground plane 670 is decomposed and separated into a static ground plane 680 and a dynamic ground plane 690 using a 2D CNN 672. Features in this entangled neural ground plane parameterize both static and dynamic features of the scene, for instance, a car as well as the road below it. As further shown in FIG. 6C, the entangled neural ground plane 670 is fed into the 2D CNN 672, which is a fully convolutional 2D network that disentangles the entangled neural ground plane 670 into the static ground plane 680 and the dynamic ground plane 690, containing static and dynamic features. The 2D CNN 672 also transforms the entangled neural ground plane 670 to the compactified $\mathbb{R}^2$ space, as described above. Vertices in this compactified space are arranged on regular grids close to the camera and grow increasingly sparse with increasing distance. It is noted that the 2D CNN 672 in the ground plane space is a 3D operation, because ground planes implicitly parameterize 3D scene representations.

The method 800 also performs resampling by unprojecting CNN image features along their respective rays as parameterized via an intrinsic parameter and an extrinsic parameter of an input camera to create a discrete volume in a world space. The method 800 also performs aggregating by computing, using pillar aggregation, multilayer perception (MLP) softmax scores, in which $\alpha_i = P(f_i, x_i)$, where $P(\cdot)$ denotes the MLP and $x_i$ is a coordinate of an i-th point on the pillar, and aggregating the features as $g = \Sigma_i \alpha_i f_i$. The method 800 also performs decomposing by using a 2D CNN to decompose a 2D grid of the features represented by the entangled neural ground plane into the static neural ground plane and the dynamic neural ground plane, for example, as shown in FIG. 6A-7D.

The method 800 further performs decomposing by compositing, per-frame, of dynamic neural ground plane into a time-invariant dynamic neural ground plane via differentiable volume rendering. The method 800 also performs decomposing by selecting context frames from video captured by an input camera. This decomposing process also includes extracting a compacted, static ground plane and a compacted dynamic ground plane per each of the selected context frames. This decomposing process further includes pooling the compacted, static ground plane into a time-invariant static ground plane. The method 800 also includes estimating a depth map from the static neural ground plane and the dynamic neural ground plane, and estimating 3D bounding boxes from the depth map of the static neural ground plane and the dynamic neural ground plane. The method 800 further includes planning a trajectory of an ego vehicle according to the 3D bounding boxes estimated in a scene surrounding an ego vehicle, for example, as shown in FIG. 5.

Some aspects of the present disclosure are directed to detecting moving objects from a point cloud sequence and using information about detected moving objects to train a single-frame model for detecting objects. For example, moving objects can be detected from a point cloud sequence. A moving object can be represented as an object trace, which may be defined as a sequence of point clusters that correspond to a same object. These aspects of the present disclosure use labels to train a first model to identify moving objects in unlabeled point cloud sequences. For example, the object traces can be used as the labels. In some aspects of the present disclosure, attributes about bounding boxes can be inferred from the object traces, and these bounding boxes can be used to train a second model to detect objects in the unlabeled point cloud sequences.

In some aspects of the present disclosure, the method 800 may be performed by the system-on-a-chip (SOC) 100 (FIG. 1) or the software architecture 200 (FIG. 2) of the ego vehicle 150 (FIG. 1). That is, each of the elements of the method 800 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art.

Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of conditional neural ground planes for static-dynamic disentanglement, comprising:
   extracting, using a convolutional neural network (CNN), CNN image features from an image to form a feature tensor;
   resampling unprojected 2D features of the feature tensor to form feature pillars;
   aggregating the feature pillars to form an entangled neural ground plane; decomposing the entangled neural ground plane using a 2D CNN to decompose a 2D grid of features represented by the entangled neural ground plane into a static neural ground plane and a dynamic neural ground plane; and
   planning a trajectory of an ego vehicle according to 3D bounding boxes estimated in a scene surrounding the ego vehicle from a depth map of the static neural ground plane and the dynamic neural ground plane.

2. The method of claim 1, in which resampling comprises unprojecting the CNN image features along their respective rays as parameterized via an intrinsic parameter and an extrinsic parameter of an input camera to create a discrete volume in a world space.

3. The method of claim 1, in which aggregating comprises:
   computing, using pillar aggregation, multilayer perception (MLP) softmax scores, in which $\alpha_i = P(f_i, x_i)$, where $P(\cdot)$ denotes the MLP and $x_i$ is a coordinate of an i-th point on the feature pillars $f_i$; and
   aggregating the features as $g = \Sigma_i \alpha_i f_i$.

4. The method of claim 1, in which decomposing further compromises compositing, per-frame, of the dynamic neural ground plane into a time-invariant dynamic neural ground plane via differentiable volume rendering.

5. The method of claim 1, in which decomposing further comprises:
   selecting context frames from video captured by an input camera;
   extracting a compacted, static ground plane and a compacted dynamic ground plane per each of the selected context frames; and
   pooling the compacted, static ground plane into a time-invariant static ground plane.

6. The method of claim 1, further comprising:
   estimating the depth map from the static neural ground plane and the dynamic neural ground plane; and
   estimating the 3D bounding boxes from the depth map of the static neural ground plane and the dynamic neural ground plane.

7. A non-transitory computer-readable medium having program code recorded thereon of conditional neural ground planes for static-dynamic disentanglement, the program code being executed by a processor and comprising:
   program code to extract, using a convolutional neural network (CNN), CNN image features from an image to form a feature tensor;
   program code to resample unprojected 2D features of the feature tensor to form feature pillars;
   program code to aggregate the feature pillars to form an entangled neural ground plane;
   program code to decompose the entangled neural ground plane using a 2D CNN to decompose a 2D grid of features represented by the entangled neural ground plane into a static neural ground plane and a dynamic neural ground plane; and
   program code to plan a trajectory of an ego vehicle according to 3D bounding boxes estimated in a scene surrounding the ego vehicle from a depth map of the static neural ground plane and the dynamic neural ground plane.

8. The non-transitory computer-readable medium of claim 7, in which the program code to resample comprises program code to unproject the CNN image features along their respective rays as parameterized via an intrinsic parameter and an extrinsic parameter of an input camera to create a discrete volume in a world space.

9. The non-transitory computer-readable medium of claim 7, in which the program code to aggregate comprises:
   program code to compute, using pillar aggregation, multilayer perception (MLP) softmax scores, in which $\alpha_i = P(f_i, x_i)$, where $P(\cdot)$ denotes the MLP and $x_i$ is a coordinate of an i-th point on the feature pillars $f_i$; and
   program code to aggregate the features as $g = \Sigma_i \alpha_i f_i$.

10. The non-transitory computer-readable medium of claim 7, in which the program code to decompose further comprises program code to composite, per-frame, of the dynamic neural ground plane into a time-invariant dynamic neural ground plane via differentiable volume rendering.

11. The non-transitory computer-readable medium of claim 7, in which the program code to decompose further comprises:

program code to select context frames from video captured by an input camera;

program code to extract a compacted, static ground plane and a compacted dynamic ground plane per each of the selected context frames; and program code to pool the compacted, static ground plane into a time-invariant static ground plane.

12. The non-transitory computer-readable medium of claim 7, further comprising:

program code to estimate the depth map from the static neural ground plane and the dynamic neural ground plane; and program code to estimate the 3D bounding boxes from the depth map of the static neural ground plane and the dynamic neural ground plane.

13. A system of conditional neural ground planes for static-dynamic disentanglement, the system comprising:

a feature tensor formation model to extract, using a convolutional neural network (CNN), CNN image features from an image to form a feature tensor;

a feature pillar formation module to resample unprojected 2D features of the feature tensor to form feature pillars;

a neural ground plane formation model to aggregate the feature pillars to form an entangled neural ground plane;

a static-dynamic disentanglement model to decompose the entangled neural ground plane using a 2D CNN to decompose a 2D grid of features represented by the entangled neural ground plane into a static neural ground plane and a dynamic neural ground plane; and a planner to plan a trajectory of an ego vehicle according to 3D bounding boxes estimated in a scene surrounding the ego vehicle from a depth map of the static neural ground plane and the dynamic neural ground plane.

14. The system of claim 13, in which the static-dynamic disentanglement model is further to composite, per-frame, of the dynamic neural ground plane into a time-invariant dynamic neural ground plane via differentiable volume rendering.

15. The system of claim 13, further comprising:

a perception module to estimate the depth map from the static neural ground plane and the dynamic neural ground plane and to estimate the 3D bounding boxes from the depth map of the static neural ground plane and the dynamic neural ground plane.

\* \* \* \* \*